(12) United States Patent
Tinnes et al.

(10) Patent No.: US 8,621,647 B1
(45) Date of Patent: Dec. 31, 2013

(54) RESTRICTING PRIVILEGES OF FIRST PRIVILEGED PROCESS IN OPERATING SYSTEM USING SECOND PRIVILEGED PROCESS

(75) Inventors: Julien Tinnes, Zurich (CH); Tavis Ormandy, Zurich (CH)

(73) Assignee: Google Inc., Mountain View, CA (US)

( * ) Notice: Subject to any disclaimer, the term of this patent is extended or adjusted under 35 U.S.C. 154(b) by 1026 days.

(21) Appl. No.: 12/685,253

(22) Filed: Jan. 11, 2010

(51) Int. Cl.
*G06F 21/00* (2013.01)

(52) U.S. Cl.
USPC .................................. 726/27; 726/4

(58) Field of Classification Search
None
See application file for complete search history.

(56) References Cited

U.S. PATENT DOCUMENTS

| | | | | |
|---|---|---|---|---|
| 5,579,478 | A * | 11/1996 | Heiserman et al. | 726/4 |
| 6,308,274 | B1 * | 10/2001 | Swift | 726/9 |
| 7,406,473 | B1 * | 7/2008 | Brassow et al. | 1/1 |
| 2003/0172293 | A1 * | 9/2003 | Johnson et al. | 713/200 |
| 2006/0101019 | A1 * | 5/2006 | Nelson et al. | 707/9 |
| 2010/0057774 | A1 * | 3/2010 | Pizano et al. | 707/103 R |

OTHER PUBLICATIONS

D. Brumley and D. Song. Privtrans : Automatically Partitioning Programs for Privilege Separation. In Proceedings of the 13th USENIX Security Symposium, pp. 57-72, 2004.
Forsberg, D. Privilege Separation. In Conference Proceedings of the Second, Third and Fourth Nordic Conference on Pattern Languages of Programs VIKINGPLOP (p. 333). The Fourth Nordic Conference on Pattern Languages of Programs Sep. 23-25, 2005.
A. Bittau, P. Marchenko, M. Handley, and B. Karp. Wedge: splitting applications into reduced-privilege compartments. In Proceedings of the 5th USENIX Symposium on Networked Systems Design and Implementation, NSDI'08, pp. 309-322, Berkeley, CA, USA, 2008. USENIX Association.
D. Kilpatrick. Privman: A Library for partitioning applications. In USENIX Technical Conference, pp. 273-284, 2003.

* cited by examiner

*Primary Examiner* — Hadi Armouche
(74) *Attorney, Agent, or Firm* — Fish & Richardson P.C.

(57) ABSTRACT

Some embodiments provide a system that restricts privileges for a target process in an operating system. During operation, the system receives a request from the target process to restrict the privileges. Next, the system executes a binary that processes the request using services provided by a kernel of the operating system.

22 Claims, 2 Drawing Sheets

RESTRICTING PRIVILEGES OF FIRST PRIVILEGED PROCESS IN OPERATING SYSTEM USING SECOND PRIVILEGED PROCESS

BACKGROUND

1. Field

The present embodiments generally relate to operating systems. More specifically, the present embodiments relate to techniques for restricting privileges of processes in operating systems.

2. Related Art

Secure execution of programs in operating systems may be facilitated by granting and denying privileges on a per-process basis. In particular, minimization of privileges may reduce the ability of attacks to exploit operating-system vulnerabilities associated with such privileges. For example, privileges associated with filesystem access, network access, and/or inter-process communication or signals may be granted or denied on an as-needed basis to one or more processes within an operating system to reduce the likelihood that vulnerabilities associated with the privileges may be exploited by attacks.

However, non-root processes in operating systems are typically incapable of dropping privileges by themselves. Instead, a system administrator typically needs to use mandatory access control (MAC) to provide a policy for limiting a process's privileges. As a result, processes are incapable of dynamically restricting privileges without administrator intervention, root access, and/or changes to the kernel.

Hence, what is needed is a technique for effectively and dynamically minimizing privileges for non-root processes in operating systems without requiring administrator intervention.

SUMMARY

Some embodiments provide a system that restricts privileges for a target process in an operating system. During operation, the system receives a request from the target process to restrict the privileges. Next, the system executes a binary that processes the request using services provided by a kernel of the operating system.

In some embodiments, the privileges are associated with at least one of filesystem access, network access, and interaction with other processes.

In some embodiments, restricting filesystem access for the target process involves cloning the target process to create a privileged process and sharing filesystem information between the target process and the privileged process.

In some embodiments, the filesystem information is updated by changing an apparent root directory of the privileged process.

In some embodiments, restricting network access for the target process involves cloning the target process to create a privileged process and sharing file descriptor information between the target process and the privileged process. In these embodiments, restricting network access for the target process also involves disabling the creation of new file descriptors from the target process to disable the creation of new network sockets from the target process.

In some embodiments, the target process obtains the new file descriptors by requesting the new file descriptors from the privileged process.

In some embodiments, restricting interaction with other processes involves managing a pool of unprivileged user identifiers (UIDs) in the operating system and changing a UID of the target process to one of the unprivileged UIDs.

In some embodiments, restricting interaction with other processes involves sharing a UID or a group identifier (GID) of the target process with one or more of the other processes.

In some embodiments, the operating system corresponds to a Linux-based operating system.

In some embodiments, the binary corresponds to a root setuid binary.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for restricting privileges in an operating system. More specifically, embodiments provide a method and system for dynamically restricting privileges for non-root target processes in Linux-based operating systems. Each target process may generate a request to restrict one or more privileges. The request may then be processed by a root setuid binary to limit the process's ability to access the filesystem, network, and/or other processes in the Linux-based operating system. In addition, the root setuid binary may carry out the privilege restriction using services provided by the kernel. As a result, embodiments may enable dynamic privilege minimization for non-root processes in Linux-based operating systems without requiring administrator intervention or changes to the kernel.

Figure 1:
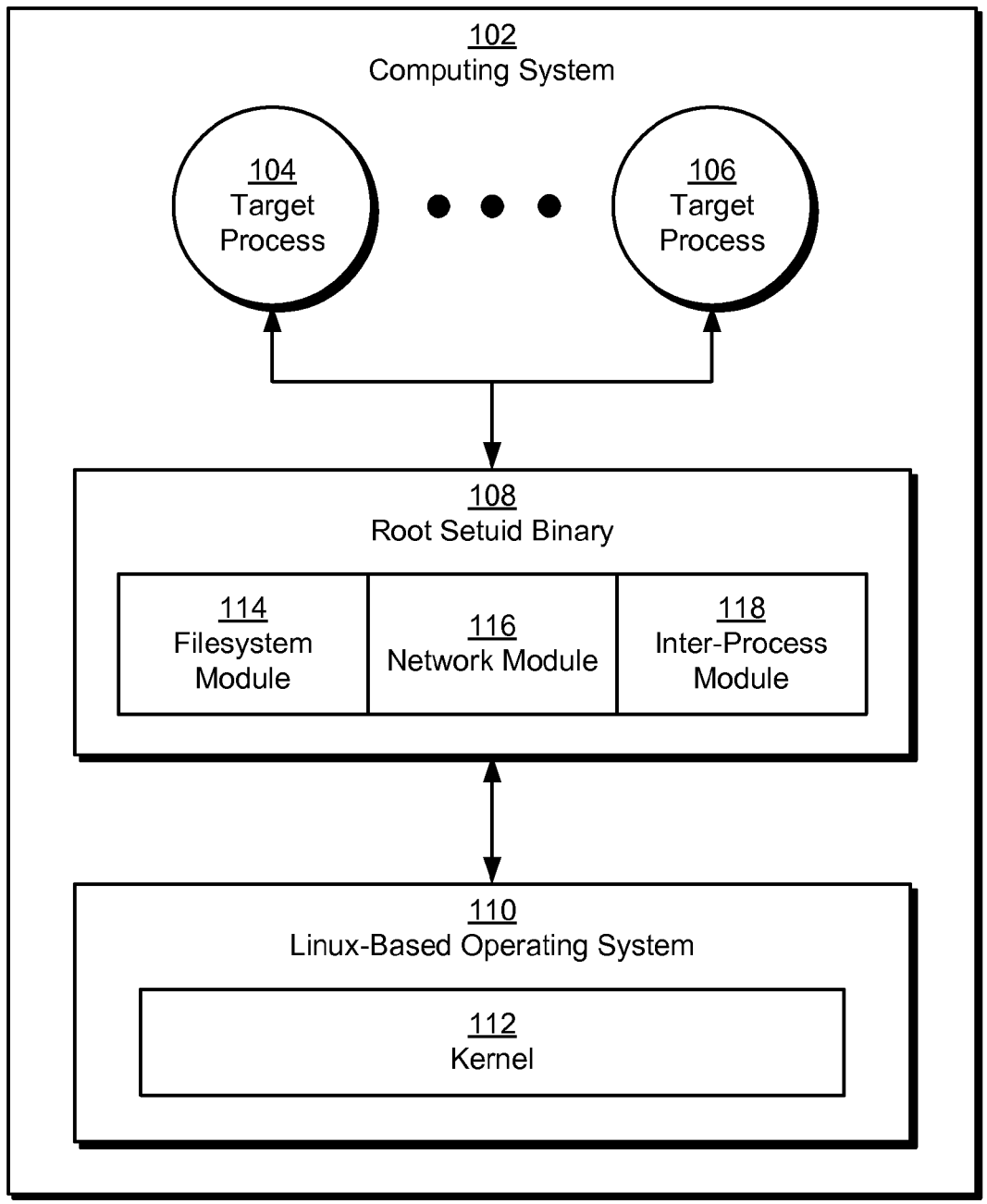
FIG. 1 shows a computer system in accordance with an embodiment.

FIG. 1 shows a computing system 102 in accordance with an embodiment. Computing system 102 includes a set of target processes 104-106, a root setuid binary 108, and a Linux-based operating system 110. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (e.g., Linux-based operating system 110) that coordinates the use of hardware and software resources on computing system 102, as well as one or more applications that perform specialized tasks for the user. For example, computing system 102 may include applications such as an email client, address book, document editor, web browser, and/or media player.

To perform tasks for the user, applications may obtain the use of hardware resources (e.g., processor, memory, I/O components, network interface card, graphics-processing unit (GPU), etc.) on computing system 102 from the operating system, as well as interact with the user through a hardware and/or software framework provided by the operating system. Each application may execute using one or more processes (e.g., target processes 104-106) within Linux-based operating system 110. For example, a web browser, word processing application, and media player may initialize, execute, and terminate as three separate processes within Linux-based operating system 110.

Moreover, Linux-based operating system 110 may grant or deny access to portions of the filesystem, network, and/or other processes based on a set of privileges associated with each process. For example, Linux-based operating system 110 may restrict the amount of storage, open files, and/or file descriptors available to a given process based on the process's privileges. Processes with root privileges may have unrestricted access to hardware and software resources on computing system 102, while non-root processes may be unable to access portions of the filesystem and/or network, other processes, and/or some system calls to Linux-based operating system 110.

Those skilled in the art will appreciate that the security of computing system 102 may be maintained by minimizing privileges for applications on computing system 102. In particular, privilege minimization within applications may reduce the exposure of security vulnerabilities associated with the privileges to attacks that exploit the security vulnerabilities. For example, restricted filesystem access may prevent attacks from accessing critical and/or sensitive portions of the filesystem on computing system 102.

To restrict the privileges of non-root processes, a security policy may be provided by an administrator of computing system 102 using mandatory access control mechanisms associated with Linux-based operating system 110. Linux-based operating system 110 is an operating system based on the LINUX® operating system. LINUX® is a registered trademark of Linus Torvalds in the U.S. and other countries. Alternatively, processes may use LINUX utilities such as "rlimits" and/or "seccomp" to restrict some privileges during execution. However, mandatory access control may require manual administrator intervention, while existing LINUX utilities may require root access and restrict privileges at a granularity that is too coarse for effective use by most applications. For example, "rlimits" may provide only limited functionality in restricting privileges, while "seccomp" may be too restrictive to allow most applications and/or processes to provide useful features to the user.

In one or more embodiments, computing system 102 includes functionality to dynamically restrict the privileges of non-root target processes 104-106 without requiring administrator intervention, root access, and/or changes to the LINUX kernel. In one or more embodiments, target processes 104-106 generate requests to restrict privileges within Linux-based operating system 110. Root setuid binary 108 may receive the requests and process the requests during execution of target processes 104-106. In one or more embodiments, root setuid binary 108 executes within Linux-based operating system 110 as a privileged and/or root process. Furthermore, root setuid binary 108 may use services (e.g., system calls, utilities, etc.) provided by a kernel 112 of Linux-based operating system 110 to restrict the privileges of target processes 104-106. In other words, root setuid binary 108 may allow non-root target processes 104-106 to use privilege restriction mechanisms typically associated with root or privileged processes without giving root privileges to target processes 104-106.

In one or more embodiments, root setuid binary 108 includes functionality to restrict multiple types of privileges for target processes 104-106. As shown in FIG. 1, root setuid binary 108 includes a filesystem module 114, a network module 116, and an inter-process module 118. Each component (e.g., filesystem module 114, network module 116, inter-process module 118) of root setuid binary 108 may be configured to handle requests from target processes 104-106 for a specific type of privilege restriction.

Filesystem module 114 may process requests from one or more target processes 104-106 to restrict filesystem access within Linux-based operating system 110. To restrict filesystem access for a target process, filesystem module 114 may clone the target process to create a privileged (e.g., root) process. Filesystem module 114 may further clone the privileged process from the target process such that filesystem information is shared between the target process and privileged process. For example, filesystem module 114 may use the "clone" system call to Linux-based operating system 110 with "CLONE_FS" as a parameter to clone the privileged process from the target process and share filesystem information between the two processes.

Once the privileged process is created from the target process, the privileged process may change the apparent root directory for both processes using a system call such as "chroot." For example, the privileged process may change the apparent root directory to a sub-directory within the filesystem's root directory to prevent the target process from accessing the filesystem outside of the sub-directory. In other words, filesystem module 114 may enable "chroot" functionality for non-root target processes 104-106 that are typically unable to use the "chroot" system call.

Network module 116 may process requests from one or more target processes 104-106 to restrict network access within Linux-based operating system 110. As with filesystem module 114, network module 116 may clone each target process to create a privileged process. In addition, the cloning may be carried out such that file descriptor information is shared between the target process and privileged process. For example, network module 116 may use the "clone" system call to Linux-based operating system 110 with "CLON- E_FILES" as a parameter to clone the privileged process from the target process and share file descriptor information between the two processes.

Network module 116 may also disable the creation of new file descriptors from the target process to restrict the target process's ability to access the network. For example, network module 116 may utilize resource limits (e.g., "rlmits") with a resource of "RLIMIT_NOFILE" and a limit of 0 to prevent the target process from creating new file descriptors, and consequently network sockets, for accessing the network. Instead, the target process may request new file descriptors from the privileged process. If the privileged process approves the requested file descriptors (e.g., based on a security policy for the target process), the privileged process creates the file descriptors and returns the file descriptors to the target process.

Alternatively, network module 116 may restrict network access for a target process by cloning a first privileged process from the target process while sharing a Unix socket between the target process and a second privileged process. The target process may then request new file descriptors from the second privileged process, which may create the new file descriptors if the new file descriptors are allowed. The first (e.g., cloned) privileged process may then obtain the new file descriptors from the second privileged process through the Unix socket. In other words, decisions regarding the approval or rejection of new file descriptors for the target process may be made by the second privileged process instead of the first privileged process.

Inter-process module 118 may include functionality to restrict interaction between each target process 104-106 and other processes in computing system 102. Such inter-process interaction may include system calls such as "ptrace," signals, and/or inter-process communication (IPC) mechanisms. To restrict inter-process interaction for a target process, inter-process module 118 may manage a pool of unprivileged user identifiers (UIDs) and/or group identifiers (GIDs) in Linux-based operating system 110 for use by target processes 104-106. Furthermore, inter-process module 118 may ensure that the unprivileged UIDs and/or GIDs are not already in use by setting a resource limit for the "RLIMIT_NPROC" resource associated with each UID and/or GID to 0.

To isolate a target process 104-106 from interaction with other processes, inter-process module 118 may change the UID of the target process to one of the unprivileged UIDs and/or GIDs. In other words, the target process may be unable to interact with other processes using signals, "ptrace," and/or IPC mechanisms after the UID and/or GID of the target process is changed to an unprivileged UID and/or GID. On the other hand, inter-process module 118 may allow the target process to interact with some processes by sharing the UID and/or GID of the target process with the other processes. In particular, inter-process module 118 may allow the target process to send signals to other processes by sharing the same UID between the target process and other processes. Furthermore, inter-process module 118 may restrict the target process's use of "ptrace" on other processes by changing the GID of the target process; a shared GID may allow the target process to run "ptrace" on other processes with the same GID, while a unique, unprivileged GID may prevent the target process from using "ptrace" on any other process.

Consequently, non-root target processes 104-106 in Linux-based operating system 110 may dynamically restrict privileges during execution by requesting the restrictions from root setuid binary 108. Moreover, root setuid binary 108 may allow target processes 104-106 to restrict privileges associated with access to the filesystem, network, and/or other processes without requiring administrator intervention, root access, and/or changes to kernel 112. Root setuid binary 108 may thus facilitate the implementation of a security policy that dynamically minimizes privileges for target processes 104-106, which in turn may reduce the incidence of security problems (e.g., attacks) on computing system 102.

Figure 2:
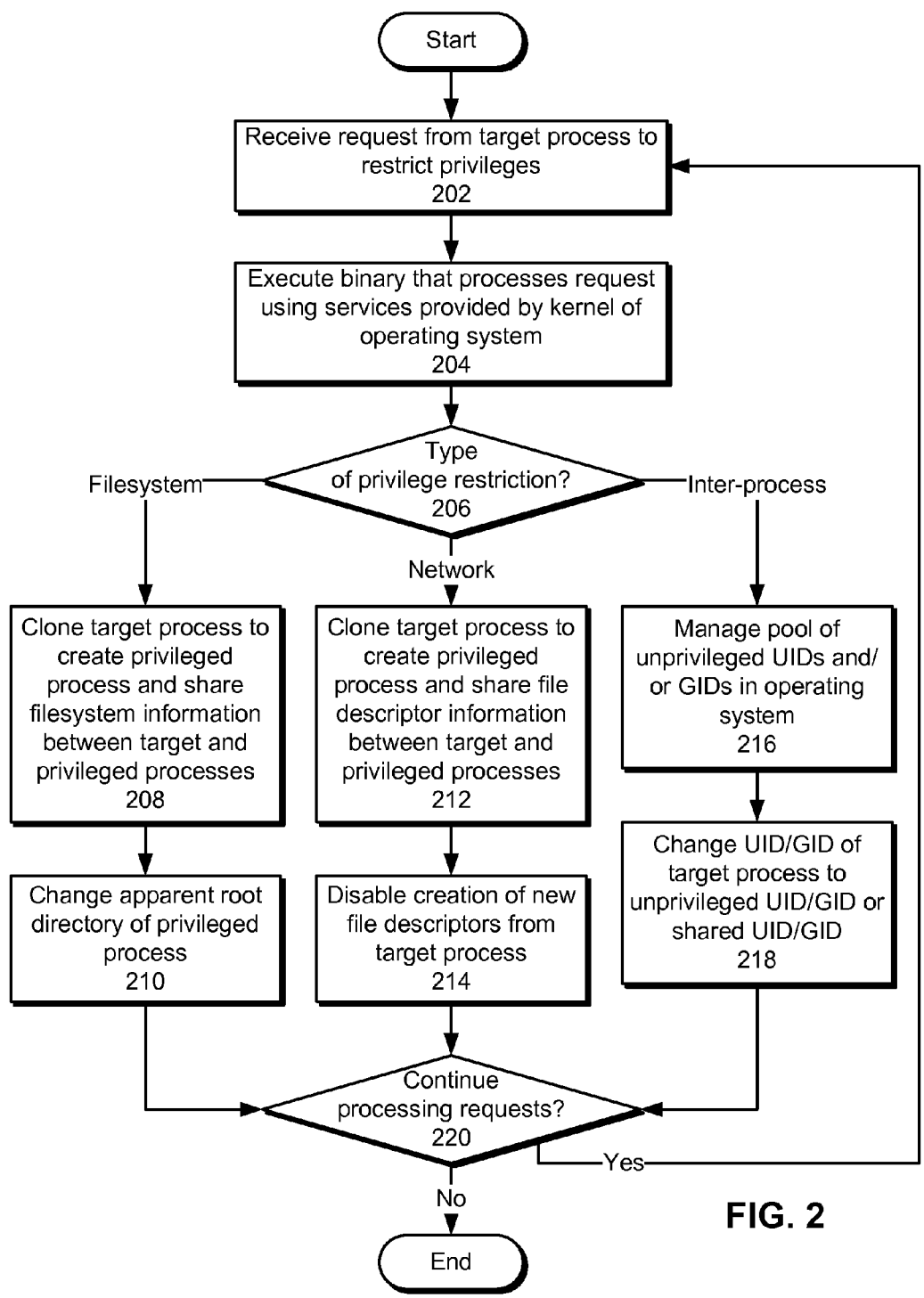
FIG. 2 shows a flowchart illustrating the process of restricting privileges for a target process in an operating system in accordance with an embodiment.

FIG. 2 shows a flowchart illustrating the process of restricting privileges for a target process in an operating system in accordance with an embodiment. In one or more embodiments, one or more of the steps may be omitted, repeated, and/or performed in a different order. Accordingly, the specific arrangement of steps shown in FIG. 2 should not be construed as limiting the scope of the technique.

Initially, a request is received from a target process to restrict privileges (operation 202) for the target process. Because the target process may execute as a non-root process in an operating system (e.g., Linux-based operating system 110 of FIG. 1), the target process may have limited capabilities in restricting privileges for itself. For example, the target process may require root access and/or administrator-provided mandatory access control to obtain or drop privileges during execution.

On the other hand, the privileges may be restricted for the target process by executing a binary that processes the request using services provided by a kernel of the operating system (operation 204). For example, the request may be processed by a root setuid binary (e.g., root setuid binary 108 of FIG. 1) executing as a root process in an operating system (e.g., Linux-based operating system 110 of FIG. 1). The root setuid binary may provide privilege restriction mechanisms associated with root access to the non-root target process.

Furthermore, the request may be processed based on the type of privilege restriction (operation 206) requested by the target process. If the privilege to be restricted is associated with filesystem access, the target process is cloned to create a privileged process and to share filesystem information between the target and privileged processes (operation 208). For example, the privileged process may be cloned from the target process using the "clone" system call to an operating system with "CLONE_FS" as a parameter. Next, the apparent root directory of the privileged process is changed (operation 210) to provide "chroot" functionality for the non-privileged target process. Such "chroot" functionality may limit the target process's access to the filesystem outside of the apparent root directory. For example, "chroot" functionality may be used to prevent attacks from reading from, writing to, and/or accessing sensitive areas of the filesystem using the target process.

If the privilege to be restricted is associated with network access, the target process is cloned to create a privileged process and to share file descriptor information between the target and privileged processes (operation 212). For example, the privileged process may be cloned from the target process using the "clone" system call to an operating system with "CLONE_FILES" as a parameter. Next, the creation of new file descriptors from the target process is disabled (operation 214). For example, a resource limit for the "RLIMIT_NOFILE" resource associated with the target process may be set to 0 to prevent new file descriptors from being created by the process.

Because the target process may be unable to create new network connections without obtaining new file descriptors, the target process is effectively restricted in the ability to access the network. Instead, the target process may access the network by requesting new file descriptors from the privileged process, which may create and return the new file descriptors to the target process if the new file descriptors are allowed by a security policy for the target process. As a result, restricted network access may prevent attacks from transmitting and/or receiving information over the network using the target process.

As described above, the enforcement of the security policy may alternatively be provided by a second privileged process that shares a Unix socket with the target process. If a new file descriptor is approved by the second privileged process, the new file descriptors are obtained by the first (e.g., cloned) privileged process through the Unix socket on behalf of the target process. In other words, decisions regarding the creation of new file descriptors for the target process may be offloaded from the cloned privileged process to the second privileged process.

Finally, if the privilege to be restricted is associated with inter-process interaction (e.g., signals, ptrace, IPC mechanisms, etc.), a pool of unprivileged UIDs and/or GIDs is managed in the operating system (operation 216). The pool may only contain unused UIDs and/or GIDs; as a result, each of the UIDs and/or GIDs may be associated with a resource limit of 0 for the "RLIMIT_NPROC" resource. Next, the UID and/or GID of the target process is changed to either an unprivileged UID and/or GID from the pool or a shared UID and/or GID (operation 218). In particular, the UID and/or GID may be changed to an unprivileged UID and/or GID if the target process is to be restricted from any interaction with other processes. Conversely, the UID and/or GID may be changed to the UID and/or GID assigned to one or more other processes if inter-process interaction is allowed between the target process and the other processes. For example, the UID and/or GID of the target process may be changed to a UID and/or GID shared between processes with restricted privileges to enable the use of "ptrace" and/or signals between the processes.

Requests for restriction of privileges may continue to be processed (operation 220). For example, requests may continue to be processed during execution of non-root target processes to minimize privileges for the target processes and/or to implement a security policy for the target processes. If processing of requests from target processes is to continue, each request is received (operation 202) and processed using services provided by the kernel of the operating system (operation 204). Furthermore, the request may be processed based on the type of privilege restriction requested (operations 206-218) so that different types and levels of privilege restriction may be provided to the target processes.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computer-implemented method for restricting privileges for a target process in an operating system, comprising:
   receiving a request from the target process to restrict the privileges; and
   executing a binary that processes the request using services provided by a kernel of the operating system,
   wherein the privileges are associated with filesystem access, and wherein restricting filesystem access for the target process involves:
   cloning the target process to:
      create a privileged process; and
      share filesystem information between the target process and the privileged process.

2. The computer-implemented method of claim 1, wherein the filesystem information is updated by changing an apparent root directory of the privileged process.

3. The computer-implemented method of claim 1, wherein the binary corresponds to a root setuid binary.

4. A computer-implemented method for restricting privileges for a target process in an operating system, comprising:
   receiving a request from the target process to restrict the privileges; and
   executing a binary that processes the request using services provided by a kernel of the operating system,
   wherein the privileges are associated with network access, and wherein restricting network access for the target process involves:
   cloning the target process to:
      create a privileged process; and
      share file descriptor information between the target process and the privileged process; and
   disabling the creation of new file descriptors from the target process to disable the creation of new network sockets from the target process.

5. The computer-implemented method of claim 4, wherein the target process obtains the new file descriptors by requesting the new file descriptors from the privileged process.

6. The computer-implemented method of claim 4, wherein the binary corresponds to a root setuid binary.

7. A system for restricting privileges for a target process in an operating system, comprising:
   a hardware module;
   a non-transitory computer-readable storage medium including:
      a kernel of the operating system configured to receive a request from the target process to restrict the privileges; and
      a binary configured to process the request using services provided by the kernel, wherein the privileges are associated with filesystem access, and wherein restricting filesystem access for the target process involves:
      cloning the target process to:
         create a privileged process; and
         share information between the target process and the privileged process.

8. The system of claim 7, wherein the filesystem information is updated by changing an apparent root directory of the privileged process.

9. The system of claim 7, wherein the binary correspond to a root setuid binary.

10. A system for restricting privileges for a target process in an operating system, comprising:
   a hardware module;
   a non-transitory computer-readable storage medium including:
      a kernel of the operating system configured to receive a request from the target process to restrict the privileges; and
      a binary configured to process the request using services provided by the kernel, wherein the privileges are associated with network access, and wherein restricting network access for the target process involves:

cloning the target process to:
  create a privileged process; and
  share file descriptor information between the target process and the privileged process; and
disabling the creation of new file descriptors from the target process to disable the creation of new network sockets from the target process.

11. The system of claim 10, wherein the target process obtains the new file descriptors by requesting the new file descriptors from the privileged process.

12. The system of claim 10, wherein the binary corresponds to a root setuid binary.

13. A non-transitory computer-readable storage medium storing instructions that when executed by a computer cause the computer to perform a method for restricting privileges for a target process in an operating system, the method comprising:
receiving a request from the target process to restrict the privileges; and
executing a binary that processes the request using services provided by a kernel of the operating system,
wherein the privileges are associated with filesystem access, and wherein restricting filesystem access for the target process involves:
  cloning the target process to:
    create a privileged process; and
    share filesystem information between the target process and the privileged process.

14. The computer-readable storage medium of claim 13, wherein the filesystem information is updated by changing an apparent root directory of the privileged process.

15. The computer-readable storage medium of claim 13, wherein the binary correspond to a root setuid binary.

16. A computer-readable storage medium storing instructions that when executed by a computer cause the computer to perform a method for restricting privileges for a target process in an operating system, the method comprising:
receiving a request from the target process to restrict the privileges; and
executing a binary that processes the request using services provided by a kernel of the operating system,
wherein the privileges are associated with network access, and wherein restricting network access for the target process involves:
  cloning the target process to:
    create a privileged process; and
    share file descriptor information between the target process and the privileged process; and
disabling the creation of new file descriptors from the target process to disable the creation of new network sockets from the target process.

17. The computer-readable storage medium of claim 16, wherein the target process obtains the new file descriptors by requesting the new file descriptors from the privileged process.

18. The computer-readable storage medium of claim 16, wherein the binary corresponds to a root setuid binary.

19. A non-transitory computer-readable storage medium storing instructions that when executed by a computer cause the computer to perform a method comprising:
receiving, from a non-root target process in an operating system, a request to restrict the privileges for the non-root target process itself; and
executing, as a root process, a binary that processes the request using services provided by a kernel of the operating system and restricts the privileges for the non-root target process as a result of processing the request, wherein the privileges for the non-root target process are associated with network access, and wherein executing the binary includes cloning the target process to generate a first privileged process while sharing a network socket between the target process and a second privileged process, and sharing file descriptor information between the first privileged process and the second privileged process through the network socket.

20. The computer-readable storage medium of claim 19, wherein the privileges for the non-root target process are associated with interaction with other processes, and wherein restricting interaction with other processes involves:
managing a pool of unprivileged user identifiers (UIDs) in the operating system; and
changing a UID of the target process to one of the unprivileged UIDs.

21. The computer-readable storage medium of claim 19, wherein the privileges for the non-root target process are associated with interaction with other processes, and wherein restricting interaction with other processes involves:
sharing a UID or a group identifier (GID) of the target process with one or more of the other processes.

22. The computer-implemented method of claim 19, wherein the binary corresponds to a root setuid binary.

* * * * *

UNITED STATES PATENT AND TRADEMARK OFFICE
CERTIFICATE OF CORRECTION

PATENT NO.         : 8,621,647 B1                                Page 1 of 1
APPLICATION NO.    : 12/685253
DATED              : December 31, 2013
INVENTOR(S)        : Julien Tinnes et al.

It is certified that error appears in the above-identified patent and that said Letters Patent is hereby corrected as shown below:

Title Page, (75) Inventors: after "Tavis Ormandy", please delete "Zurich (CH)" and insert therefor
-- Palo Alto, CA (US) --; and In the Claims Column 10, line 44, Claim 22, please delete "computer-implemented method" and insert therefor
-- computer-readable storage medium --.

Signed and Sealed this
Twentieth Day of May, 2014

Michelle K. Lee
*Deputy Director of the United States Patent and Trademark Office*